(12) United States Patent
Mahar

(10) Patent No.: US 10,118,773 B2
(45) Date of Patent: Nov. 6, 2018

(54) MASS FLOW CONVEYOR TABLE FOR AUTOMATED PRESCRIPTION FULFILLMENT

(71) Applicant: Humana Inc., Louisville, KY (US)

(72) Inventor: Michael Mahar, Phoenix, AZ (US)

(73) Assignee: Humana Inc., Louisville, KY (US)

(*) Notice: Subject to any disclaimer, the term of this patent is extended or adjusted under 35 U.S.C. 154(b) by 0 days.

(21) Appl. No.: 15/455,544

(22) Filed: Mar. 10, 2017

(65) Prior Publication Data
US 2018/0257875 A1    Sep. 13, 2018

(51) Int. Cl.
*B65G 47/51*    (2006.01)
*B65G 47/68*    (2006.01)
*B65G 47/71*    (2006.01)

(52) U.S. Cl.
CPC ....... *B65G 47/684* (2013.01); *B65G 47/5159* (2013.01); *B65G 47/5186* (2013.01); *B65G 47/71* (2013.01); *B65G 2201/0244* (2013.01)

(58) Field of Classification Search
CPC ...... B65G 47/52; B65G 43/00; B65G 47/684; B65G 47/682; B65G 47/5145; B65G 47/5188; B65G 47/5159; B65G 47/5186
See application file for complete search history.

(56) References Cited

U.S. PATENT DOCUMENTS

| | | | |
|---|---|---|---|
| 2,315,880 A | 4/1943 | Stiles | |
| 2,389,696 A | 11/1945 | Stiles | |
| 2,560,995 A | 7/1951 | Stiles | |
| 3,044,604 A | 7/1962 | Steigleder | |
| 3,673,967 A | 7/1972 | Kropf | |
| 3,895,716 A | 7/1975 | Ugo | |
| 4,003,466 A | 1/1977 | Muth et al. | |
| 4,401,207 A * | 8/1983 | Garvey | B65G 47/684 198/347.4 |
| 5,161,665 A | 11/1992 | Cragun | |
| 6,304,797 B1 | 10/2001 | Shusterman | |
| 6,516,938 B1 | 2/2003 | Paselsky et al. | |
| 6,575,287 B2 | 6/2003 | Garvey et al. | |
| 6,612,425 B1 | 9/2003 | Garvey | |
| 6,648,124 B1 | 11/2003 | Garvey | |
| 6,959,802 B1 | 11/2005 | Garvey | |
| 6,964,329 B1 | 11/2005 | DiBianca et al. | |
| 7,252,186 B2 | 8/2007 | Paquin et al. | |
| 7,322,459 B2 | 1/2008 | Garvey | |
| 7,556,777 B2 | 7/2009 | Victor | |
| 7,617,926 B2 | 11/2009 | Jacob et al. | |
| 9,714,144 B2 * | 7/2017 | Earling | B65G 47/684 |
| 9,741,197 B2 | 8/2017 | Ghouri et al. | |
| 9,845,201 B1 * | 12/2017 | Trinh | B65G 43/08 |
| 2003/0106772 A1 * | 6/2003 | Garvey | B65G 47/268 198/443 |
| 2007/0010910 A1 | 1/2007 | Pinney et al. | |

(Continued)

*Primary Examiner* — Mark A Deuble
(74) *Attorney, Agent, or Firm* — Standley Law Group LLP

(57) ABSTRACT

An automated method and system for distributing prescription vials from upstream locations of a pharmacy to various downstream destinations using a stacked configuration of outbound lanes so that vials will enter the first outbound lane that is not blocked. The distribution table of the present invention has a lower portion having outbound lanes and an upper portion having outbound lanes and where the table is adapted to move vials in a loop pattern around the lower and upper portions.

26 Claims, 1 Drawing Sheet

(56) References Cited

U.S. PATENT DOCUMENTS

| | | |
|---|---|---|
| 2008/0059228 A1 | 3/2008 | Bossi et al. |
| 2008/0119958 A1 | 5/2008 | Bear et al. |
| 2011/0133948 A1 | 6/2011 | Ervin |
| 2015/0169846 A1 | 6/2015 | Pedrazzini |
| 2016/0209438 A1 | 7/2016 | Savonsalmi et al. |

\* cited by examiner

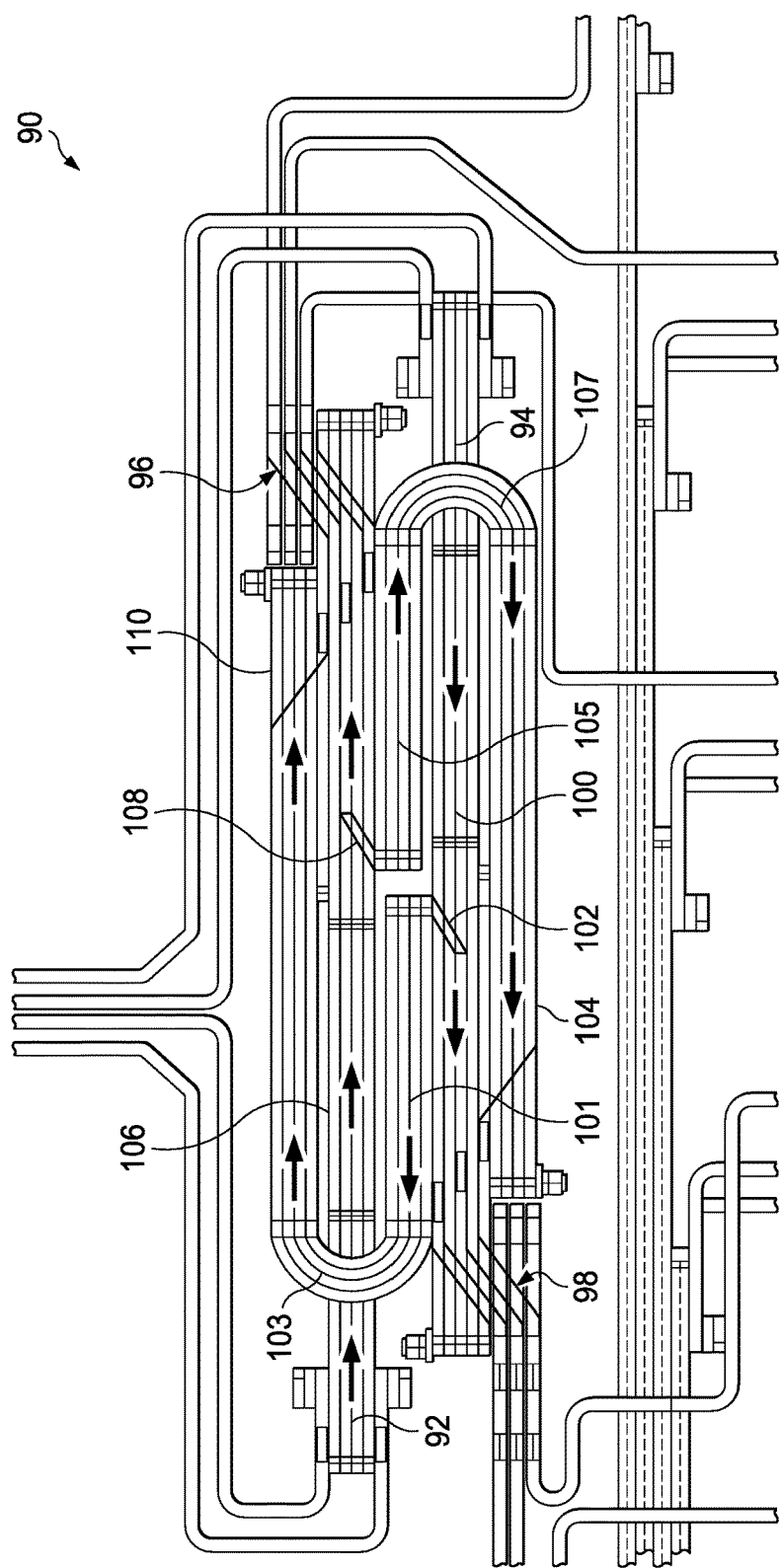

MASS FLOW CONVEYOR TABLE FOR AUTOMATED PRESCRIPTION FULFILLMENT

BACKGROUND

The present invention is directed to the field of automated dispensing systems, more particularly to the transport of objects such as pharmacy bottles/vials through an automated dispensing system. The present invention relates to an automated method and system for distributing prescription vials from upstream locations of an automated pharmacy system to various downstream destinations using a stacked configuration of outbound lands so that vials will enter the first outbound lane that is open. The distribution table of the present invention has a lower portion having outbound lanes and an upper portion having outbound lanes and where the table is adapted to move vials in a loop pattern around the lower and upper portions.

Many health benefit plan providers and retail pharmacies offer their clients the option of obtaining prescription drugs by mail. Mail order pharmacies ship prescription drugs to a client's home so the client is not required to visit a retail pharmacy to fill a prescription in person. For clients with chronic conditions or other health conditions that require maintenance drugs, a mail order prescription program is an attractive benefit because it is more convenient for the clients and typically less expensive than obtaining prescription drugs at a neighborhood pharmacy. Clients have the option of purchasing many widely-prescribed maintenance drugs, for example, in a 60-day or even a 90-day supply at a lower cost than a 30-day supply.

Most mail order pharmacies use automated systems and dispensing lines to process and ship a high volume of prescriptions on a daily basis. Each prescription medication is typically dispensed into a vial or other container labeled with data from an electronic order that identifies the patient, drug (e.g., by NDC), dosage, and quantity. Each medication is dispensed in its own vial and in many instances, multiple vials are combined into a single package and shipped to a single address for a client with one or more chronic conditions requiring multiple medications. The automated dispensing system, therefore, must be intelligent and capable of determining which vials should be combined into a single package. The system must also be capable of routing the vials through the system to their appropriate destinations. Sensors deployed at many locations along the system detect the prescription information on the bottles along with RFID tag information to intelligently route and divert the vials to the appropriate conveyor or destination. If the vial is to be combined with other vials (multi-vial order), the vials are sorted and grouped together, preferably towards the end of the dispensing line. The vials are ultimately routed to the final location for packaging and mailing to the consumer.

Automated dispensing lines typically comprise multiple sorting stations and therefore, require functionality to route and divert vials to the appropriate station. The process of routing and diverting vials for sorting and consolidation as well as other reasons can increase vial travel and processing time.

Depending upon how the technology is implemented and deployed within a mail order pharmacy, a substantial number of steps in the fulfillment process may be automated and the need for human intervention minimized. Transporting bottles through the automated dispensing lines in an efficient, timely, accurate, and consistent manner is crucial for filling the high volume of mail order prescriptions.

One technique for processing multi-prescription orders is to group the vials for the order and process them together so that all vials arrive for packaging and shipping as a group. Although "group processing" of vials is a logical approach to processing and packaging vials destined for a single address, it is not an efficient approach. Implementation of "group processing" in an automated dispensing line may require development of sophisticated algorithms for determining a reasonable or adequate route for the vials to travel as well as holding or reordering of other orders to permit the vials for a multi-prescription order to travel on the line as a group. The requirement for holding and reordering of orders increases vial processing time. In addition, processing of the vials in a group may require longer overall travel times for the vials as the vials are routed as a group and required to make unnecessary stops at stations other than the one station that has the appropriate medication for the vial.

A more efficient approach to processing of multi-prescription orders involves processing each vial of medication separately and then sorting and consolidating or regrouping them for packaging and shipping to a single address. Single vial processing is typically more efficient than group vial processing and reduces the overall travel and processing time for each vial. Single vial processing, however, requires the development of methods for tracking the vials during processing and eventually, sorting and consolidating them for packaging and shipping. The sorting/consolidation process typically involves diverting vials of a multi-prescription order to a sorting station where vials are held until all of the vials for an order have arrived. The vials are grouped at the station and then released for packaging.

Processing times for vials on an automated dispensing line are impacted by various routing and diverting techniques that are employed to facilitate single vial processing as well as multi-prescription order processing. There is a need for an improved pharmaceutical vial processing system and method that reduces processing delays attributable to routing and diverting techniques.

Within a typical pharmacy production facility, there are automatic processes for the counting and sorting of pill tablets. For example, orders for vials of particular pills are processed automatically through an integrated system of pill counters and conveyors for transporting the vials to the appropriate outbound conveyor location (e.g., or a sorter location). Typically, these facilities are configured with multiple outbound conveyor lanes to allow for higher vial production volumes.

However, with this type of arrangement, multiple vials assigned to one specific order might be distributed to different take away or outbound conveyors which presents problems with the desired goal of getting all of the vials to reach the same downstream order sorter location. When a vial assigned to an order does not reach the designated order sorter location at approximately the same time as the other vials in the same order, the release of that order will be delayed, slowing order throughput and diminishing overall productivity of the system.

Additional complications can also arise because demand for different drugs constantly changes which can result in high vial numbers occupying an inbound lane. To cope with these high vial numbers, the control system in typical conveyor systems would have to transfer vials across conveyor lanes up to three times or more to keep both the load balanced on the inbound lane and get the vials to their correct order sorter location. These systems were set up as single-file conveyor lanes throughout a majority of the system. Such a system requires complex control systems, sensors, and a large number of diverter devices for diverting vials from one conveyor onto another. The need for such complex control systems having a large number of hardware components decreases the speed of the automated systems, increases the cost of the systems, and increases the probability that the system will malfunction or break down.

Product conveyor and accumulation systems are previously known. For example, U.S. Pat. Nos. 6,575,287 and 6,648,124, describe product conveying and accumulation systems for transporting products from an upstream to a downstream location. These systems are comprised of multiple conveyors positioned next to each other to move objects from one end of the conveyor to the other end. These systems can also be used with guide rails and object guides to move objects to desired locations or outbound channels. If these outbound channels are full or backed up, the objects are allowed to circulate around the conveyor system until a channel becomes free.

The present invention relates to a new type of automated pharmacy prescription fulfillment system using specifically configured mass flow conveyor tables at predetermined points in the system to route vials to desired destinations within the automated pharmacy system. These mass flow conveyor tables allow vials to move along the conveyors systems in a mass flow rather than a single-file line. These mass flow tables eliminate the need for complex control systems, reduce the need for many diversion mechanisms for diverting vials off single-file conveyor lanes, and reduce the need for many sensors for sensing and balancing vial loads on single-lane conveyors. For example, use of mass flow conveyor tables at certain predetermined points of the automated pharmacy system can be used to accumulate vials and/or to distribute them to outbound conveyor lanes automatically as these outbound lanes become available (or open up). These mass flow conveyor tables can also be configured to provide overflow lanes in case the primary lanes back up.

The present system uses specifically configured mass flow vial conveyor systems at predetermined locations of the automated pharmacy line to fill prescription orders in a more effective, faster, and efficient way than traditional conveyor systems using single-file conveyor lines.

SUMMARY OF THE GENERAL INVENTIVE CONCEPT

In one embodiment of the invention, the invention is comprised of: a conveyor table comprised of a lower portion and a top portion, wherein the lower portion is comprised of at least one conveyor and the top portion is comprised of at least one conveyor, wherein the at least one conveyor of the lower portion moves in the opposite direction as the at least one conveyor of the top portion; a first inbound conveyor lane for moving vials to the lower portion of the conveyor table; a second inbound conveyor lane for moving vials to the top portion of the conveyor table; a first set of outbound lanes for moving vials from the lower portion of the conveyor table to a downstream location; a second set of outbound lanes for moving vials from the top portion of the conveyor table to another downstream location; wherein the first and second set of outbound lanes are each comprised of a plurality of outbound lanes configured in a stacked configuration so vials moving on the table will enter the first outbound lane the vials encounter that is not blocked; wherein the at least one conveyor of the lower portion moves vials towards the first set of outbound lanes; and wherein the at least one conveyor of the top portion moves vials towards the second set of outbound lanes.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 illustrates one embodiment of the mass flow vial conveyor system for distributing vials to the downstream stations (e.g., capper stations).

DETAILED DESCRIPTION OF EXEMPLARY EMBODIMENT(S)

The following detailed description of the example embodiments refers to the accompanying FIGURES that form a part thereof. The detailed description provides explanations by way of exemplary embodiments. It is to be understood that other embodiments may be used having mechanical and electrical changes that incorporate the scope of the present invention without departing from the spirit of the invention.

The present invention relates to an automated prescription filling system using a mass flow vial conveyor system for accumulating and/or distributing vials for prescription fulfillment. Mass flow conveyor systems or tables move bottles/vials in mass quantities as opposed to a single-file, dedicated, conveyor line process used at traditional automated pharmacy fulfillment systems. Use of these mass flow conveyor systems increases speed and increases reliability of the pharmacy line by reducing the number of controls needed for a single-file type pharmacy line.

In one embodiment, each vial or bottle is transported through the system on a puck. The puck is a high density transport mechanism having a placeholder for holding a prescription vial upright as it moves on the conveyor system. The terms "vial" and "bottle" are used interchangeably herein. In one embodiment, the puck is a circular hockey puck type device with an opening in the middle of it for holding a vial upright as it moves on the conveyor system. Pucks are needed because the individual vials will tip over on the conveyor system without the puck to hold it upright. Each puck preferably has an RFID chip or tag comprised of an antenna. As the pucks move on the conveyors, they communicate with numerous RFID antenna readers positioned along the conveyor system using emitted RF signals. The readers communicate with the control system so it knows exactly where that prescription vial is located on the conveyor system. Because the RFID tag is associated with the prescription intended for that vial (e.g., barcode on the vial), the system knows where each prescription vial to be filled is located in the automated prescription filing system. If the prescription is part of an order that has multiple prescriptions (multiple-vial order), the system knows where each of the prescriptions or vials for that order are located in the automated system. As will be described below, the control system is programmed with the intelligence to divert or hold vials based on this knowledge.

After the vials have been filled with pills at the ATC banks, the vials are transported to the capping area. The capping stations take the vials and seal and cap the vial openings. If the system determines that the vial is a child safety prescription, the vial is adapted with a child safety closure such as a ring or snap. In the embodiment of the system shown, there are six capping stations. One of the problems addressed by the present invention relates to keeping vial loads at the capping stations balanced (e.g., amount of vials fed to each capping station is evenly balanced). Traditional systems used a complex arrangement of conveyors and diversion mechanisms to feed vials to the capping stations to maintain load balance at the stations. In the preferred embodiment of the invention, the system is configured to keep the vial loads at each of the capping stations balanced to avoid vial congestion and to keep vial flow moving efficiently.

The present invention uses a novel conveyor table for feeding vials to the capping stations in a balanced manner without the need for complex sensors and diversion controls. FIG. 1 illustrates a top-view diagram of one embodiment of the mass flow vial conveyor system 90 (or mass flow distribution table) for distributing vials to the capping stations. In one embodiment, the table is designed to provide a two-layer, mass flow, distribution of prescription vials between the pill counters and the capping system. The vials are fed into the table via two separate conveyor inputs (92, 94 respectfully) and are distributed via the conveyors that make up the mass flow table to two sets of three stacked outbound/output conveyor lanes (96, 98 respectively). In other words, vials are fed into the system via input conveyor lanes 92 and 94. The vials move around the table and enter the first outbound conveyor lane they hit that is not full. For example, when a vial enters via inbound conveyor lane 94 they move across the lower portion 100 of the conveyor table until they hit barrier or guide 102 that is angled to drive the vials to the bottom edge 104 of the table. The vials then move around the edge of the table until they hit the first stack of stacked output conveyor lanes 98 (3 stacked output lanes). The vials move into the first open lane (non-full lane or non-blocked lane) they hit. If all the lanes of the first stack of stacked output conveyor lanes are full or blocked, the vials will move around the table to the top portion 106 of the conveyor table until the vials reach the second stack of stacked output conveyor lanes 96. The vials can also enter the table via inbound conveyor lane 92, moving across the table until they hit barrier or guide 108 that is placed at an angle to drive the vials to the top edge 110 of the table. The vials then move around the edge of the table and hit the second stack of stacked output conveyor lanes 96. In this embodiment, each of the six outbound lanes from the table feed vials to one of the capping stations (i.e., one outbound lane of the table is dedicated to one capping station). In this way, vials are automatically distributed to the capping stations in a balanced manner without complex sensors or diversion control systems. Plastic guide members are arranged to guide the vials into each of the outbound conveyor lanes of the conveyor table. Again, these plastic guides are arranged in a stacked configuration so that vials will move into the first outbound lane available for distribution to a downstream location (e.g., the capping stations).

The guide members are preferably pieces of hard white plastic—e.g., ultra-high molecular weight (UHMW) polyethylene barriers or guide portions—placed on the table. These plastic pieces are shaped in such a way as to direct or guide puck flow into the first outbound lane that is open. In essence, the methodology relies on physics. If enough vials/pucks have gathered in the first outbound lane, for instance, then the shape of the UHMW guide portion will flow the pucks down the moving conveyor to the next outbound lane, e.g., analogous to the movement of a cascading waterfall. When one lane fills up, the pucks coming down the table move down to the next open lane.

Pairing these plastic "arms" or barriers or guides with conveyor movement directs puck flow, eliminating the need for many PLC- and software-operated controls (e.g., photo-electric sensors, diverts, puck stops, RFIDs). The UHMW plastic material is extremely durable, known for its ability to resist abrasion and impact. Because of these properties, UHMW's benefits include cutting down on maintenance costs and energy consumption.

In one embodiment, the conveyor table is preferably comprised of a first intermediate conveyor 101 (sandwiched between the top and lower portions of the table) for moving vials from the lower portion of the table to the top portion of the table. The first intermediate conveyor has a curved portion 103 for moving the vials so that they move from the direction of travel of the lower portion of the table to the direction of travel of the top portion of the table. Similarly, the conveyor table is preferably comprised of a second intermediate conveyor 105 (sandwiched between the top and lower portions of the table) for moving vials from the top portion of the table to the lower portion of the table. The second intermediate conveyor has a curved portion 107 for moving the vials so that they move from the direction of travel of the top portion of the table to the direction of travel of the lower portion of the table.

In one embodiment of the invention, the system is configured so that all six outbound lanes are open and used to evenly balance the load of vials sent to each of the six capping stations. That is the speed of the inbound lanes, table conveyors, and outbound lanes can be set so that vial load is evenly distributed to the six capping stations. In another embodiment, the table is adapted so that the prescription vial load coming from the inputs are distributed to the first two output conveyors with the third output conveyor used only as an overflow output. In other words, in normal operation, the first two lanes of each of the outbound stacks are running fast enough to take all vials entering the table. Again, this table uses moving conveyors and strategically placed barriers to distribute the bottles to the output conveyors in a balanced fashion without the use of dedicated conveyors or complex controls and sensors.

While certain embodiments of the present invention are described in detail above, the scope of the invention is not to be considered limited by such disclosure, and modifications are possible without departing from the spirit of the invention as evidenced by the following claims:

What is claimed is:

1. A vial conveying and distributing system for distributing vials, comprising:
   a conveyor table comprised of a lower portion and a top portion, wherein the lower portion is comprised of at least one conveyor and the top portion is comprised of at least one conveyor, wherein the at least one conveyor of the lower portion moves in the opposite direction as the at least one conveyor of the top portion;
   a first inbound conveyor lane for moving vials to the lower portion of the conveyor table;
   a second inbound conveyor lane for moving vials to the top portion of the conveyor table;
   a first set of outbound lanes for moving vials from the lower portion of the conveyor table to a downstream location;
   a second set of outbound lanes for moving vials from the top portion of the conveyor table to another downstream location;

wherein the first and second set of outbound lanes are each comprised of a plurality of outbound lanes, each of the plurality of outbound lanes having an opening and wherein the openings of the plurality of outbound lanes are configured in a stacked configuration so vials moving on the table will enter the first outbound lane the vials encounter that is open, and wherein each of the plurality of outbound lanes are separated from another outbound lane by a wall;

wherein the at least one conveyor of the lower portion moves vials towards the first set of outbound lanes; and wherein the at least one conveyor of the top portion moves vials towards the second set of outbound lanes.

2. The vial conveying and distributing system of claim 1, further comprising:
a first intermediate conveyor sandwiched between the top and lower portions of the table for moving vials from the lower portion of the table to the top portion of the table.

3. The vial conveying and distributing system of claim 2, wherein the first intermediate conveyor has a curved portion for moving the vials so that the vials move from the direction of travel of the lower portion of the table to the direction of travel of the top portion of the table.

4. The vial conveying and distributing system of claim 1, further comprising:
a second intermediate conveyor sandwiched between the top and lower portions of the table for moving vials from the top portion of the table to the lower portion of the table.

5. The vial conveying and distributing system of claim 4, wherein the second intermediate conveyor has a curved portion for moving the vials so that the vials move from the direction of travel of the top portion of the table to the direction of travel of the lower portion of the table.

6. The vial conveying and distributing system of claim 1, wherein the vial is a bottle for holding pills or tablets.

7. The vial conveying and distributing system of claim 1, wherein the first and second set of outbound lanes are each comprised of a set of three stacked outbound lanes.

8. The vial conveying and distributing system of claim 1, wherein each of the plurality of outbound lanes are configured in a stacked configuration using plastic guide members for guiding vials into the first open outbound lane.

9. The vial conveying and distributing system of claim 1, further comprising:
a first barrier positioned on the lower portion of the table at an angle to guide vials to a first lower edge of the table; and
a second barrier positioned on the top portion of the table at an angle to guide vials to a second top edge of the table.

10. The vial conveying and distributing system of claim 1, wherein the downstream location is a set of capping stations for capping the vials and wherein the another downstream location is another set of capping stations for capping the vials.

11. A vial conveying and distributing system for distributing vials, comprising:
a conveyor table comprised of a lower portion and a top portion, wherein the lower portion is comprised of at least one conveyor and the top portion is comprised of at least one conveyor, wherein the at least one conveyor of the lower portion moves in the opposite direction as the at least one conveyor of the top portion;
a first inbound conveyor lane for moving vials to the lower portion of the conveyor table;

a second inbound conveyor lane for moving vials to the top portion of the conveyor table;
a first set of outbound lanes for moving vials from the lower portion of the conveyor table to a downstream location;
a second set of outbound lanes for moving vials from the top portion of the conveyor table to another downstream location;
wherein the first and second set of outbound lanes are each comprised of a plurality of outbound lanes, each of the plurality of outbound lanes having an opening and wherein the openings of the plurality of outbound lanes are configured in a stacked configuration so vials moving on the table will enter the first outbound lane the vials encounter that is open, and wherein each of the plurality of outbound lanes are separated from another outbound lane by a wall;
wherein the at least one conveyor of the lower portion moves vials in the direction of the first set of outbound lanes; and
wherein the at least one conveyor of the top portion moves vials in the direction of the second set of outbound lanes.

12. The vial conveying and distributing system of claim 11, further comprising:
a first intermediate conveyor sandwiched between the top and lower portions of the table for moving vials from the lower portion of the table to the top portion of the table.

13. The vial conveying and distributing system of claim 12, wherein the first intermediate conveyor has a curved portion for moving the vials so that the vials move from the direction of travel of the lower portion of the table to the direction of travel of the top portion of the table.

14. The vial conveying and distributing system of claim 11, further comprising:
a second intermediate conveyor sandwiched between the top and lower portions of the table for moving vials from the top portion of the table to the lower portion of the table.

15. The vial conveying and distributing system of claim 14, wherein the second intermediate conveyor has a curved portion for moving the vials so that the vials move from the direction of travel of the top portion of the table to the direction of travel of the lower portion of the table.

16. The vial conveying and distributing system of claim 11, wherein the vial is a bottle for holding pills or tablets.

17. The vial conveying and distributing system of claim 11, wherein the first and second set of outbound lanes are each comprised of a set of three stacked outbound lanes.

18. The vial conveying and distributing system of claim 11, wherein each of the plurality of outbound lanes are configured in a stacked configuration using plastic guide members for guiding vials into the first open outbound lane.

19. The vial conveying and distributing system of claim 11, further comprising:
a first barrier positioned on the lower portion of the table at an angle to guide vials to a first lower edge of the table; and
a second barrier positioned on the top portion of the table at an angle to guide vials to a second top edge of the table.

20. A vial conveying and distributing system for distributing vials, comprising:
a conveyor table comprised of a lower portion and a top portion, wherein the lower portion is comprised of at least one conveyor and the top portion is comprised of at least one conveyor, wherein the at least one conveyor of the lower portion moves in the opposite direction as the at least one conveyor of the top portion;

a first inbound conveyor lane for moving vials to the lower portion of the conveyor table;

a second inbound conveyor lane for moving vials to the top portion of the conveyor table;

a first set of outbound lanes for moving vials from the lower portion of the conveyor table to a downstream location;

a second set of outbound lanes for moving vials from the top portion of the conveyor table to another downstream location;

wherein the first and second set of outbound lanes are each comprised of a plurality of outbound lanes, each of the plurality of outbound lanes having an opening and wherein the openings of the plurality of outbound lanes are configured in a stacked configuration so vials moving on the table will enter the first outbound lane the vials encounter that is open, and wherein each of the plurality of outbound lanes are separated from another outbound lane by a wall;

wherein the at least one conveyor of the lower portion moves vials in the direction of the first set of outbound lanes;

wherein the at least one conveyor of the top portion moves vials in the direction of the second set of outbound lanes;

a first barrier positioned on the lower portion of the table at an angle to guide vials to a first lower edge of the table; and a second barrier positioned on the top portion of the table at an angle to guide vials to a second top edge of the table.

21. The vial conveying and distributing system of claim 20, further comprising:

a first intermediate conveyor sandwiched between the top and lower portions of the table for moving vials from the lower portion of the table to the top portion of the table.

22. The vial conveying and distributing system of claim 21, wherein the first intermediate conveyor has a curved portion for moving the vials so that the vials move from the direction of travel of the lower portion of the table to the direction of travel of the top portion of the table.

23. The vial conveying and distributing system of claim 11, further comprising:

a second intermediate conveyor sandwiched between the top and lower portions of the table for moving vials from the top portion of the table to the lower portion of the table.

24. The vial conveying and distributing system of claim 23, wherein the second intermediate conveyor has a curved portion for moving the vials so that the vials move from the direction of travel of the top portion of the table to the direction of travel of the lower portion of the table.

25. The vial conveying and distributing system of claim 20, wherein the first and second set of outbound lanes are each comprised of a set of three stacked outbound lanes.

26. The vial conveying and distributing system of claim 20, wherein each of the plurality of outbound lanes are configured in a stack configuration using plastic guide members for guiding vials into the first open outbound lane.

* * * * *